(12) United States Patent
Kim

(10) Patent No.: US 6,890,620 B2
(45) Date of Patent: May 10, 2005

(54) LAMINATE FILM

(75) Inventor: Yang-Pioung Kim, Seoul (KR)

(73) Assignee: GMP Co., Ltd., Kyonggi (KR)

( * ) Notice: Subject to any disclaimer, the term of this patent is extended or adjusted under 35 U.S.C. 154(b) by 0 days.

(21) Appl. No.: 10/293,250

(22) Filed: Nov. 13, 2002

(65) Prior Publication Data
US 2004/0053008 A1 Mar. 18, 2004

(30) Foreign Application Priority Data
Sep. 12, 2002 (KR) .................. 10-2002-0055221

(51) Int. Cl.[7] .................................. B32B 3/28
(52) U.S. Cl. ...................... 428/167; 428/172
(58) Field of Search ............... 428/156, 167, 428/172

(56) References Cited

U.S. PATENT DOCUMENTS

| | | | | |
|---|---|---|---|---|
| 1,989,704 A | * | 2/1935 | Leguillon ........... 428/141 |
| 2,366,209 A | * | 1/1945 | Morris ................ 428/167 |
| 3,042,562 A | * | 7/1962 | Peterson ............... 428/98 |
| 4,232,068 A | * | 11/1980 | Hoh et al. ............ 428/43 |
| 4,452,840 A | * | 6/1984 | Sato et al. ........... 428/156 |
| 4,455,337 A | * | 6/1984 | Lloyd et al. ......... 428/134 |
| 5,300,263 A | * | 4/1994 | Hoopman et al. ..... 264/2.5 |

* cited by examiner

Primary Examiner—Donald J. Loney
(74) Attorney, Agent, or Firm—Harrison & Egbert

(57) ABSTRACT

A laminate film of thermoplastic resin includes V-shaped or semicircular grooves between protruded parts formed continuously in a longitudinal direction and a transverse direction of the film, on one surface thereof. Upon conducting a lamination process, generation of air pockets between the laminate film and a subject to be coated can be effectively prevented, and the laminate film does not come off the subject.

6 Claims, 6 Drawing Sheets

[fig 1a]
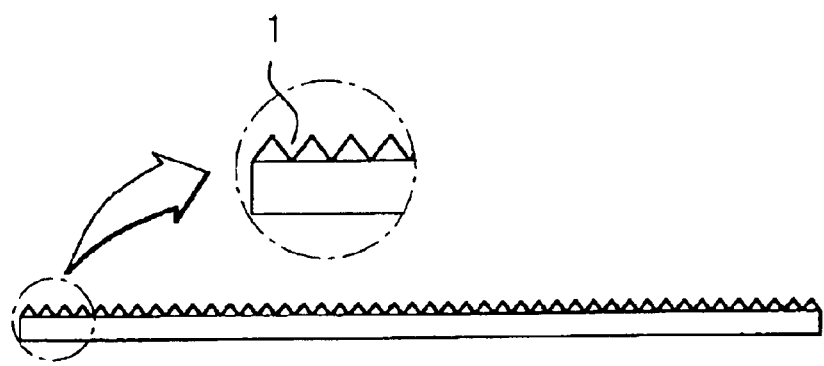
[fig 1b]
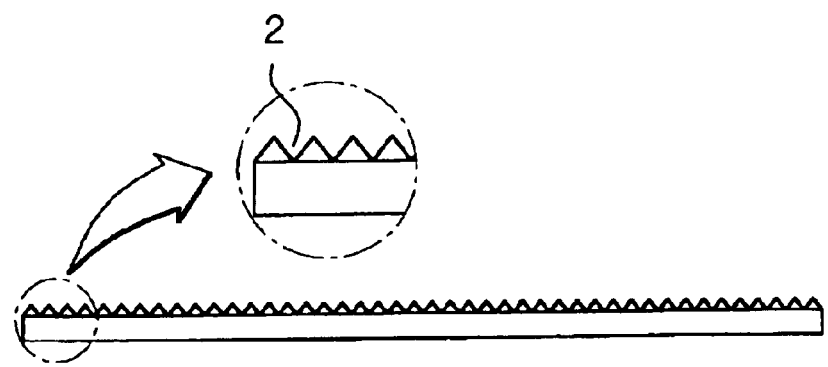

[fig 1c]
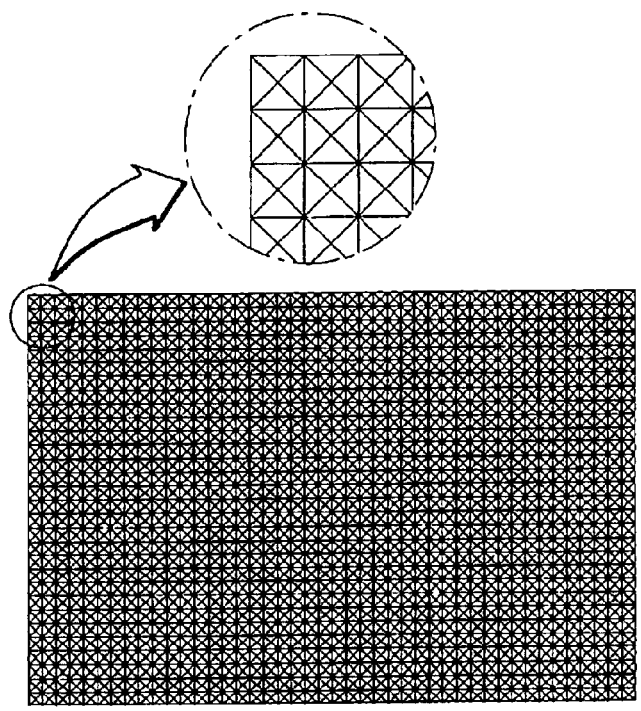
[fig 1d]
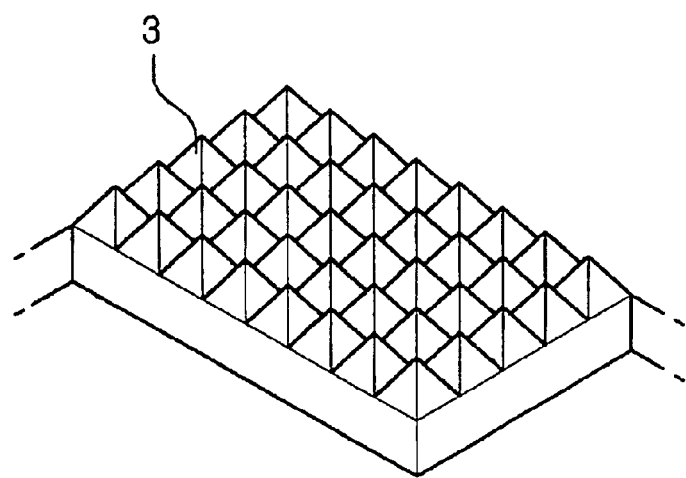

[fig 2a]
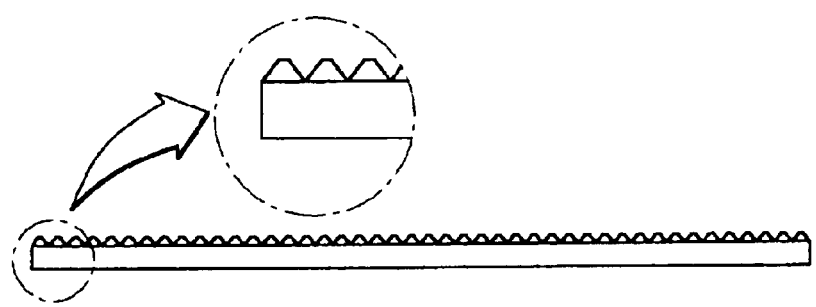
[fig 2b]
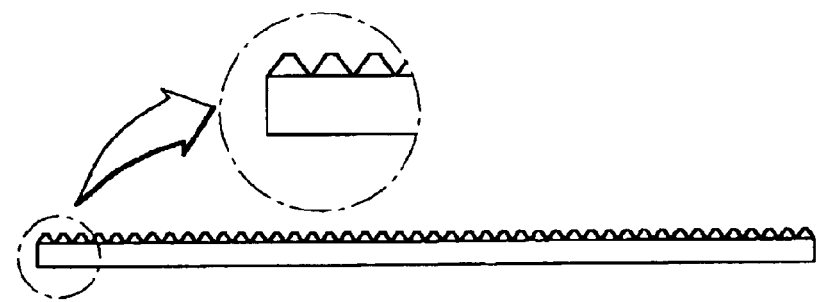

[fig 2c]
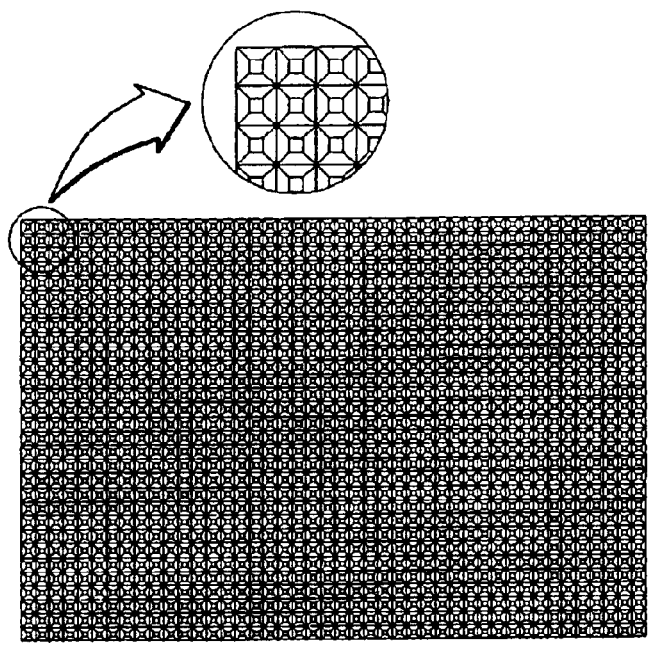
[fig 2d]
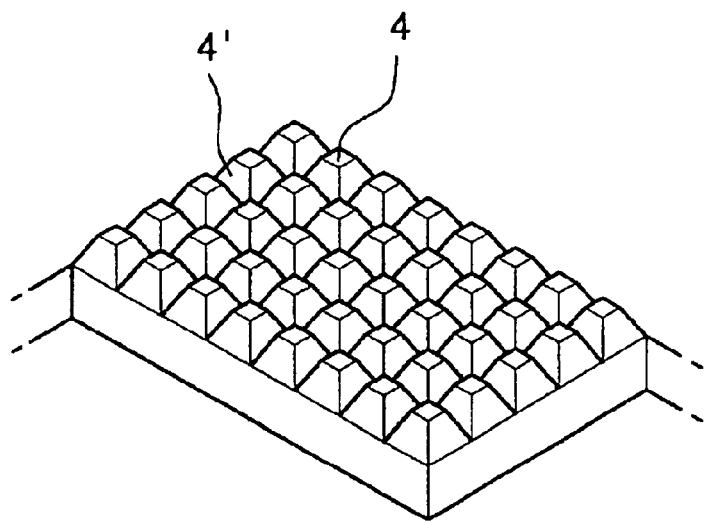

[fig 3a]
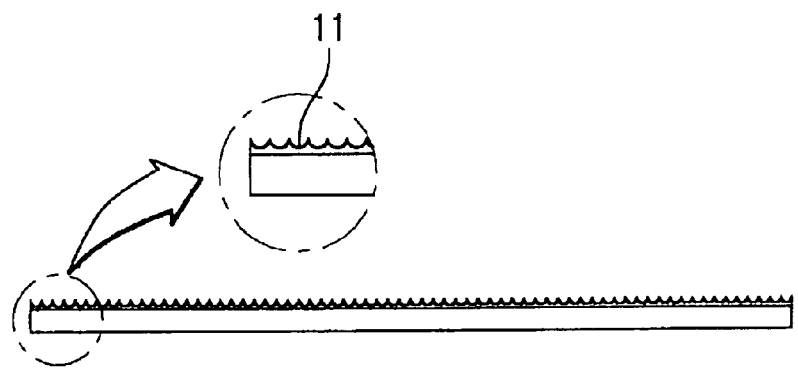
[fig 3b]
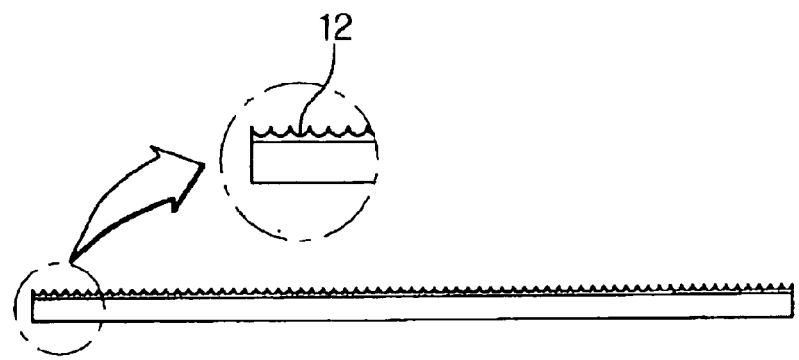

[fig 3c]
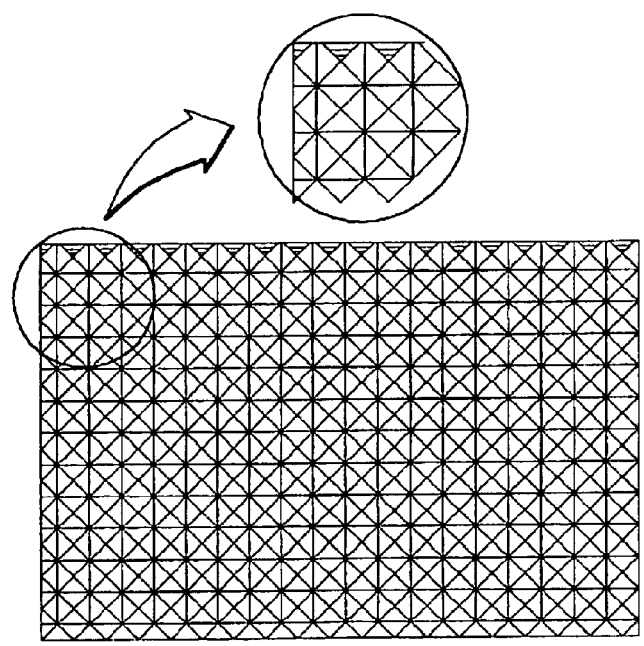
[fig 3d]
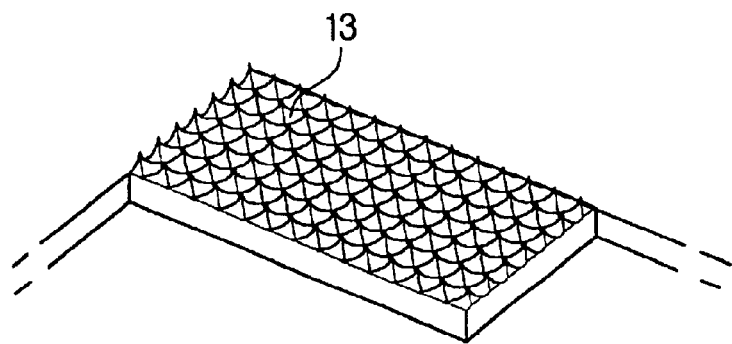

LAMINATE FILM

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to laminate films capable of preventing the formation of air pockets by air accumulation between the films and subjects to be coated upon a laminating process. More specifically, the present invention is directed to a laminate film comprising a single layer of laminate thermoplastic film having very fine grooves formed in a longitudinal direction and a transverse direction on one side thereof, and also a composite laminate film laminated with the above single laminate film as a surface layer.

BACKGROUND OF THE INVENTION

Typically, a strong corona discharge is carried out on a laminate film to roughen the film face or to form micropores thereon prior to superimposing the laminate film on a subject sheet, in order to prevent generation of air pockets between the film and the subject sheet. In addition, during production of the laminate film, a woven fabric is layered on a thermoplastic synthetic resin film, followed by passing them through two hot rollers coming in contact with each other. Such a two-layer film is cooled, and the woven fabric layer is peeled off from the resin film, whereby embossed shapes are formed on the film to prevent the formation of air pockets.

However, since the laminate film face which is subjected to corona discharge or embossing treatment comprises discontinuously formed irregularities, passages capable of continuously discharging air captured between the film and the subject cannot be formed. Thus, formation of air pockets between the film and the subject after lamination treatment cannot be effectively prevented.

As another laminate film having further improved prevention effect of air pockets than the above mentioned film, there is developed a laminate film comprising very fine grooves continuously formed only in a longitudinal direction thereof. But, this film is also disadvantageous in that air pockets cannot be sufficiently prevented in the case where the subject sheet or the laminate sheet is applied with improper tension or width of the grooves is excessively broad.

BRIEF SUMMARY OF THE INVENTION

Therefore, it is an object of the present invention is to alleviate the problems encountered in the prior arts and to provide a laminate film having excellent prevention effect of air bubbles, upon laminating work using any laminate film, in particular, wide laminate film, for a large scale preparation through a continuous rolling process in factories as well as a small scale film used in offices. Specifically, as for such a laminate film, grooves between protruded parts on the film can be continuously formed in not only a longitudinal direction but also a transverse direction of the film, thereby providing a laminate film which can further increase quality of laminated articles.

BRIEF DESCRIPTION OF THE SEVERAL VIEWS OF THE DRAWINGS

FIG. 1a is a sectional front view of a laminate film comprising V-shaped grooves between pyramids which are continuously formed according to a primary embodiment of the present invention.

FIG. 1b is a sectional side view of the laminate film comprising V-shaped grooves between pyramids which are continuously formed according to the present invention.

FIG. 1c is a plan view of the laminate film comprising the V-shaped grooves between the pyramids which are continuously formed according to the present invention.

FIG. 1d is a perspective view of the pyramids in FIG. 1c.

FIG. 2a is a sectional front view of a laminate film comprising V-shaped grooves between truncated pyramids which are continuously formed according to a second embodiment of the present invention.

FIG. 2b is a sectional side view of the laminate film comprising V-shaped grooves between truncated pyramids which are continuously formed according to the present invention.

FIG. 2c is a plan view of the laminate film comprising the V-shaped grooves between the truncated pyramids which are continuously formed according to the present invention.

FIG. 2d is a perspective view of the truncated pyramids in FIG. 2c.

FIG. 3a is a sectional front view of a laminate film comprising semicircular grooves which are continuously formed according to a third embodiment of the present invention.

FIG. 3b is a sectional side view of the laminate film comprising semicircular grooves which are continuously formed according to the present invention.

FIG. 3c is a plan view of the laminate film comprising the semicircular grooves which are continuously formed according to the present invention.

FIG. 3d is a perspective view of the semicircular grooves in FIG. 3c.

DETAILED DESCRIPTION OF THE INVENTION

During a laminating process, air pockets between a laminate film and a subject sheet may be generated, due to non-aligned rollers or uneven faces of the rollers. In addition, when pressure which is applied to the laminate is not uniformly controlled or adhesiveness between the subject sheet and the laminate film (thin sheet) is poor, the above problems are generated. In particular, such problems especially occur where the film is too thin or too wide. Efforts to develop techniques to improve the laminating process have significantly reduced conventional problems. Recently, the laminate film is superimposed on a carrier layer (release film), and thus adhesive force of the carrier layer prevents generation of such air pockets.

Further, surface processing such as corona discharge and embossing of various shapes can be performed on the laminate film, thereby obtaining more preferable effects. But even in this case, air pockets occur upon lamination.

Therefore, the present invention provides a laminate film comprising V-shaped grooves or semicircular grooves between continuously formed protruded parts in a longitudinal direction and a transverse direction of the film thereon, to effectively prevent the formation of air pockets between the subject to be coated and the laminate film.

Referring to FIGS. 1a to 1d, V-shaped grooves 1 and 2 between the continuously formed pyramids in a longitudinal direction as well as a transverse direction of the film are respectively shown in a sectional front view of FIG. 1a, and a sectional side view of FIG. 1b. A plan view of such grooves is shown in FIG. 1c. Furthermore, the pyramids 3 on the laminate film are shown in FIG. 1d.

The above film is a basic type, from which various laminate films may be derived. In accordance with a second embodiment of the present invention, there is provided a laminate film comprising V-shaped grooves between truncated pyramids in both of a longitudinal direction and a transverse direction thereof, in which such grooves are formed with regular spacing. A sectional front view of this laminate film is shown in FIG. 2a. Also, a sectional side view and a plan view of the film are shown in FIGS. 2b and 2c, respectively. The truncated pyramids 4 having a protruded part 4' on the film are shown in FIG. 2d.

In addition, V-shaped grooves may be continuously formed in a longitudinal direction with no spaces therebetween and may be formed with regular spacing in a transverse direction, or vice versa, thus obtaining applied laminate films.

As a further embodiment of the present invention, semicircular grooves 11 and 12 are continuously formed in a longitudinal direction as well as a transverse direction on the laminate film, respectively. The resultant film is shown in a sectional front view of FIG. 3a, a sectional side view of FIG. 3b and a plan view of FIG. 3c. The depressed parts 13 on the film are shown in FIG. 3d.

In general, the laminate film is several microns (20–80 microns) thick. The depth of each V-shaped groove or semicircular groove depends on the thickness of the film. Preferably, the groove depth is less than a half of the film thickness.

In consequence of production of various laminate films, it can be found that the ldminate film comprising V-shaped or semicircular grooves is most preferable. Although V-shaped or semicircular grooves which are continuously formed with no spaces are desirable, in the case where the grooves are formed with regular spacing, spaces between V-shaped or semicircular grooves should be less than 1 mm. Too shallow depth of the grooves results in decreased air-discharging effect, while too deep grooves leads to reduced surface smoothness after lamination. Since the V-shaped or semicircular grooves are too shallow to be discerned with the naked eye, the grooves are melted by hot roller during a laminating process and are rendered to be flat. While the grooves on the laminate film function to discharge air as soon as the film is bonded to the subject sheet by the rollers coming in contact with each other, the protruded parts on the film are melted by heat and become even under pressure.

The laminate film may be used as a single layer of thermoplastic resin films with relatively low melting points, for instance, polyethylene film, polypropylene film, ethylene acrylic acid ethyl copolymer resin film, EVA film etc. Further, it may be a composite laminate film laminated with a paper layer having a silicon release film layer or polyester film.

As described above, in the inventive laminate film comprising continuously formed V-shaped or semicircular grooves in a longitudinal direction and a transverse direction thereof, when adhesion is performed by hot rollers coming in contact with each other, air which may be accumulated in such V-shaped or semicircular grooves can be completely eliminated, and the protruded parts, such as pyramids and truncated pyramids, and the depressed parts are melted and become flat under pressure. Thereby, articles laminated with such a laminate film have no drawbacks such as generation of air pockets, and can have a clear transparent surface. In addition, such articles have drastically increased adhesiveness. Thus, the laminate film of the present invention can significantly improve qualities of laminated articles.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

I claim:

1. An article for use in a laminating process comprising:
   a flexible laminate film having a length dimension and a width dimension, said laminate film having a first surface on one side thereof and a second surface on an opposite side thereof, only said first surface having V-shaped or semicircular grooves formed thereon and extending continuously across said length dimension and across said width dimension, said laminate film having a thickness of between 20 and 80 microns, said grooves having a depth less than a half of said thickness of said laminate film, said laminate film being of a polymer selected from the group consisting of polyethylene, polypropylene, ethylene acrylic acid, ethylene copolymer resin and ethylene vinyl acetate.

2. The article of claim 1, said grooves having no spaces therebetween.

3. The article of claim 1, said grooves extending continuously with no spaces therebetween along said length dimension, said grooves extending with regular spacing along said width dimension.

4. The article of claim 1, said grooves extending continuously with no spaces therebetween along said width dimension, said grooves extending with regular spacing along said length dimension.

5. The article of claim 1, further comprising:
   a paper layer overlying said grooves on said first surface of said laminate film.

6. The article of claim 1, further comprising:
   a polyester film overlying said grooves on said first surface of said laminate film.

* * * * *